United States Patent [19]

Hastings et al.

[11] 3,967,277

[45] June 29, 1976

[54] RADIO NAVIGATION SYSTEM

[75] Inventors: Charles E. Hastings, Newport News; William A. Runion, Tabb, both of Va.

[73] Assignee: Teledyne, Inc., Los Angeles, Calif.

[22] Filed: Dec. 10, 1970

[21] Appl. No.: 96,767

Related U.S. Application Data

[63] Continuation-in-part of Ser. No. 764,503, Oct. 2, 1968, abandoned, which is a continuation-in-part of Ser. Nos. 713,202, March 14, 1968, abandoned, and Ser. No. 713,442, March 15, 1968, abandoned.

[52] U.S. Cl. .................... 343/105 R; 343/112 R; 343/105 H; 343/105 LS
[51] Int. Cl.² ........................................... G01S 1/30
[58] Field of Search ........ 343/105 R, 112 R, 105 H, 343/105 LS

[56] References Cited
UNITED STATES PATENTS

| | | | |
|---|---|---|---|
| 2,148,267 | 2/1939 | Honore | 343/105 LS |
| 2,651,032 | 9/1953 | Torcheux et al. | 343/105 R |
| 2,724,114 | 11/1955 | Kaufman | 343/105 R |
| 2,850,729 | 9/1958 | Gaudillere | 343/105 R |
| 3,016,533 | 1/1962 | Frank | 343/112 C |
| 3,206,751 | 9/1965 | Knight | 343/105 R |

*Primary Examiner*—Richard A. Farley
*Assistant Examiner*—S. C. Buczinski
*Attorney, Agent, or Firm*—Ronald W. Reagin

[57] ABSTRACT

A radio navigation system is disclosed which includes a first pair of fixed transmitting stations, a second pair of fixed transmitting stations and a mobile station. The mobile station includes a receiver having first means for deriving a first signal indicative of the difference in the distances between the mobile station and each of the first pair of fixed stations and second means for deriving a second signal indicative of the difference in the distances between the mobile station and each of the second pair of fixed stations. Summing means are provided for adding the first and second signals to obtain a third signal indicative of a first line of position on which the mobile station is located, and difference means are provided for subtracting one of the first and second signals from the other to obtain a fourth signal indicative of a second line of position on which the mobile station is located.

21 Claims, 11 Drawing Figures

CHARLES E. HASTINGS
WILLIAM A. ROUNION
INVENTORS

BY Ronald W Reagin

ATTORNEY

CHARLES E. HASTINGS
WILLIAM A. ROUNION
INVENTORS

BY Ronald W Reagin
ATTORNEY

CHARLES E. HASTINGS
WILLIAM A. ROUNION
INVENTORS

BY *Ronald W Reagin*

ATTORNEY

Fig. 11
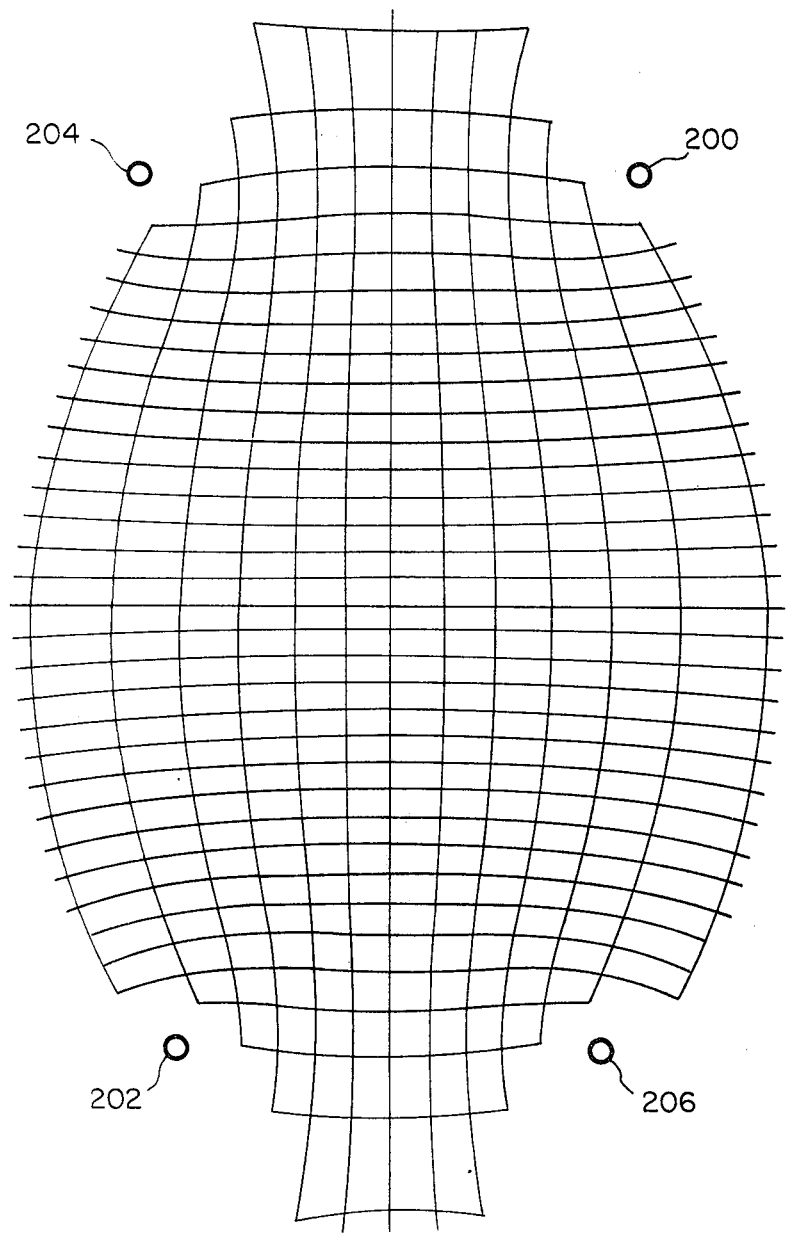
CHARLES E. HASTINGS
WILLIAM A. ROUNION
INVENTORS
ATTORNEY

RADIO NAVIGATION SYSTEM

This application is a continuation-in-part of application Ser. No. 764,503, filed Oct. 2, 1968, which was itself a continuation-in-part of application Ser. No. 713,202 filed Mar. 14, 1968 and Ser. No. 713,442 filed Mar. 15, 1968, now all abandoned.

This invention relates to radio navigation systems, and more particularly to such systems which determine the location of a mobile station with respect to fixed stations by measuring the transit time of radio signals between the mobile station and the fixed stations.

A number of radio navigation systems are known in the prior art in which a mobile station receives radio signals from two fixed stations at known locations. The mobile station then processes these signals to receive an indication of the transit time of the signals between the fixed stations and the mobile station. Since the radio signals travel at a known velocity, this transit time is a linear function of the distance between the mobile station and the respective fixed stations. The mobile station then in effect subtracts the transit time of one signal from the other to obtain an indication of the difference in transit time of the signals, and thus the difference in the distances between the mobile station and the first fixed station and the mobile station and the second fixed station. This subtraction process eliminates many of the constant but difficult to measure parameters in the system and the resultant difference signal is a function only of the difference in the distances between the mobile station and the two fixed stations. In some such systems, the radio signals being broadcast are continuous wave signals and the difference in transit time is measured by measuring the difference in phases of the signals as received. Such systems are sometimes called isophase systems. In other such systems, the radio signals being broadcast are synchronized pulses, and the difference in transit time is measured directly. Typical of such systems are the various Loran systems.

If the mobile station is then navigated so that the meter indicating this difference signal is maintained at a constant reading, it is known that the mobile station must follow the path of a hyperbola which has as its foci the location of the two fixed stations. A chart showing a family of such hyperbolas having as their foci the location of the two fixed stations can be prepared, with this family of hyperbolas on the chart representing so-called hyperbolic lines of position. A mobile station equipped with such charts and with a suitable receiver can then compare the indication of the receiver at any given instant with the chart and know that it is located at that instant on a particular hyperbolic line of position.

In such systems, it is the usual practice to provide two such sets of hyperbolic lines of position, with a first pair of fixed transmitting stations broadcasting suitable signals such that a mobile station equipped with a proper receiver can determine its location on a first hyperbolic line of position with regard to the first pair of fixed stations and a second pair of fixed stations broadcasting suitable signals such that the mobile station can determine its location on a second hyperbolic line of position with regard to the second pair of fixed stations. The intersection of these two hyperbolic lines of position thus establishes an unambiguous location or fix of the mobile station. Usually, the two pairs of fixed stations include a common station so that only three stations are required in such systems.

The maximum accuracy for the system of the type just described occurs in the portion of the chart showing the two overlapping families of hyperbolas in which the hyperbolas intersect each other at the greatest angles, that is at angles closest to 90°. In this region of the chart, slight errors in determining which hyperbolic lines of position the mobile station is on result in only slight errors in determining the position of the mobile station. However, there are relatively large areas on the chart in which, because of the inherent characteristics of hyperbolas, the two families of hyperbolas intersect each other at relatively small angles, and are even practically parallel to each other. In these areas, slight errors in determining the hyperbolic lines of position result in substantial errors in determining the location of the mobile station. Thus, a mobile station operating in these regions must be either prepared to accept low levels of performance from the system, or the system is not useful to such mobile stations.

It is accordingly an object of the present invention to provide an improved radio navigation system.

It is another object of the present invention to provide an improved radio navigation system in which the lines of position determined by the system intersect each other at larger angles over a greater portion of the area covered by the system.

It is yet another object of the present invention to provide an improved radio navigation system in which hyperbolic lines of position are used to generate additional non-hyperbolic lines of position which intersect other lines of position at substantially right angles throughout most of the area covered by the system.

Briefly stated, and in accordance with the presently preferred embodiment of the invention, a radio navigation system is provided which includes a first pair of fixed transmitting stations, a second pair of fixed transmitting stations and a mobile station. The mobile station includes a receiver having first means for deriving a first signal indicative of the difference in the distances between the mobile station and each of the first pair of fixed stations and second means for deriving a second signal indicative of the difference in the distances between the mobile station and each of the second pair of fixed stations. A summing means are provided for adding the first and second signals to obtain a third signal indicative of a first line of position on which the mobile station is located, and difference means are provided for subtracting one of the first and second signals from the other to obtain a fourth signal indicative of a second line of position on which the mobile station is located.

For a complete understanding of the present invention, together with an appreciation of its other objects and advantages, please refer to the following detailed description of the attached drawings, in which:

FIG. 11 shows a plot of the lines of position generated by the system of FIGS. 9 and 10.

Figure 1:
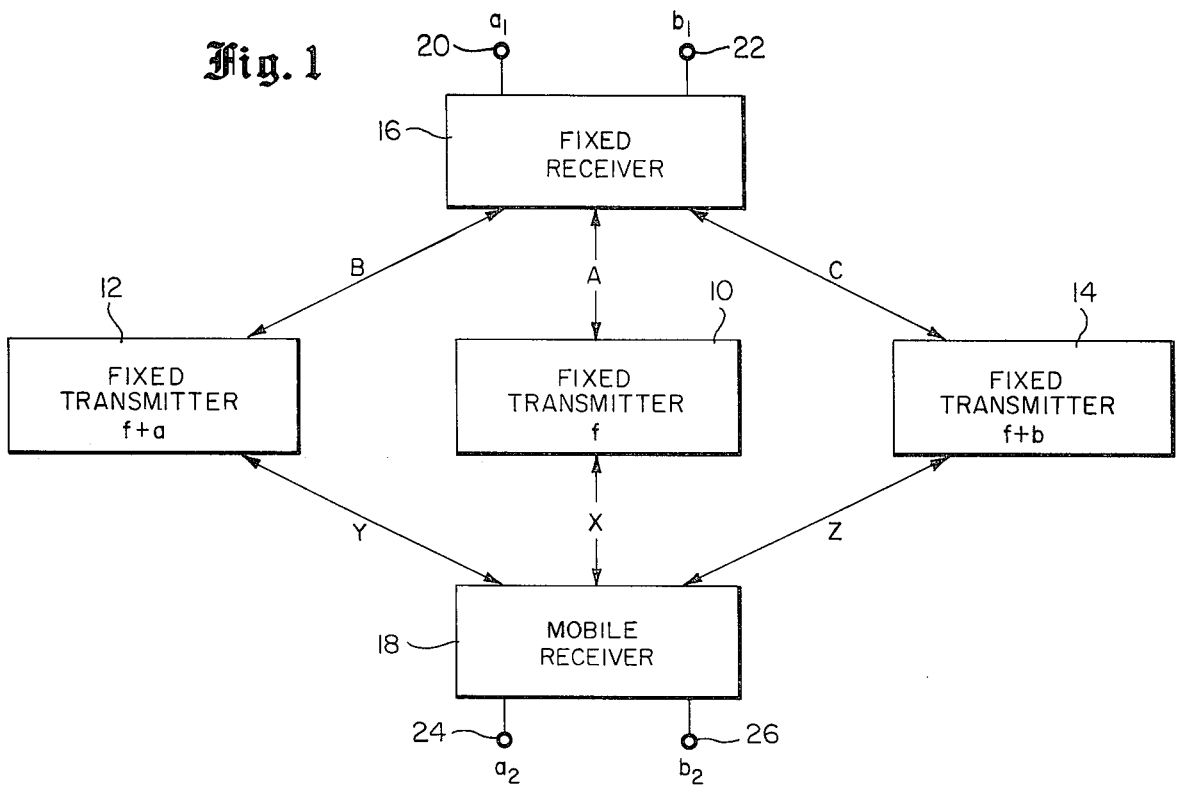
FIGS. 1 and 2 show a block diagram of an isophase radio navigation system which illustrates the present invention.
Figure 2:
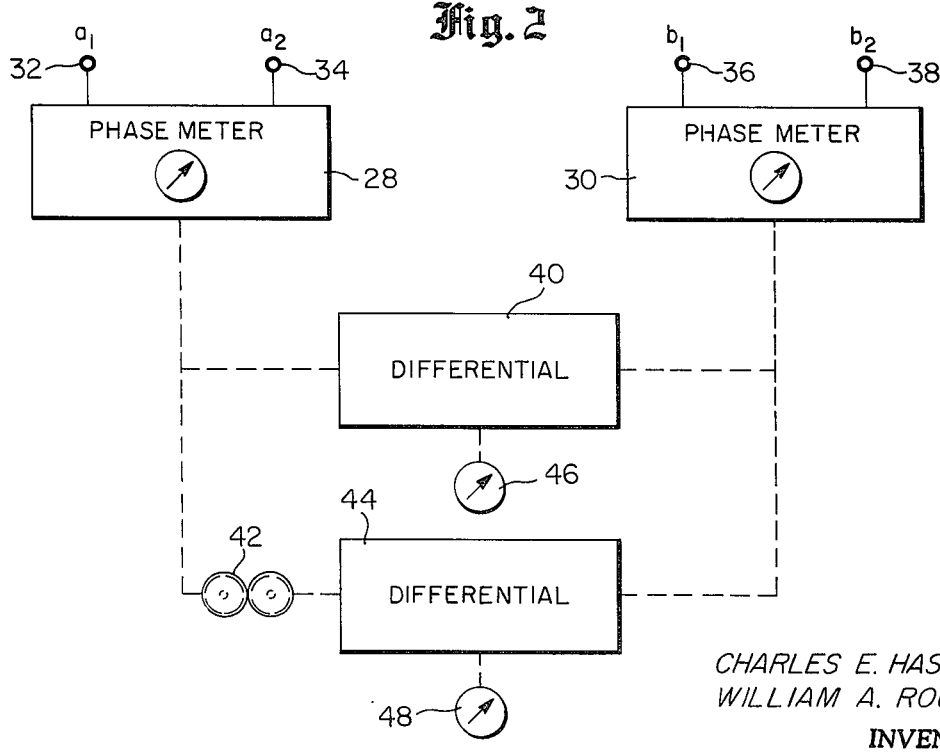

FIGS. 1 and 2 show a block diagram of an isophase radio navigation system which illustrates the principals of the present invention. As shown in FIG. 1, the system includes a first fixed transmitter 10 which radiates a continuous wave signal having a frequency $f$, a second fixed transmitter 12 which radiates a continuous wave signal having a frequency $(f + a)$, and a third fixed transmitter 14 which radiates a continuous wave signal having a frequency $(f + b)$. Each of the transmitters 10, 12 and 14 are free running, and no attempt is made to lock or synchronize the phase of the signals as transmitted by these transmitted by these transmitters. The system also includes a fixed receiver 16 and a mobile receiver 18 whose position is to be determined by the system.

FIG. 1, the letters A, B and C represent the distances between fixed receiver 16 and fixed transmitters 10, 12, and 14 respectively, while the letters, X, Y and Z represent the distances between mobile receiver 18 and fixed transmitters 10, 12 and 14 respectively. Obviously, the distances A, B and C are constant while the distances X, Y and Z are variable.

Fixed receiver 16 includes means for receiving all three of the signals being transmitted by fixed transmitters 10, 12 and 14 and means for heterodyning or mixing the signals received from fixed transmitter 10 and fixed transmitter 12 to develop the signal $a_1$. Similarly, fixed receiver 16 includes the means for heterodyning the signals from fixed transmitter 10 and fixed transmitter 14 to develop the signal $b_1$. Such receivers and mixers are well known to those skilled in the art, and accordingly, details are not shown in FIG. 1. The signals $a_1$ and $b_1$ appear on terminals 20 and 22 respectively. Similarly, mobile receiver 18 includes receivers and heterodyne means to mix the signals from transmitters 10 and 12 to develop the signal $a_2$ and from transmitters 10 and 14 to develop the signal $b_2$, which appear on terminals 24 and 26 respectively.

At this point, it may be useful to consider the phases of the signals $a_1$ and $b_1$ as developed at fixed receiver 16 and of the signals $a_2$ and $b_2$ as developed at mobile receiver 18. The signal $a_1$ is in effect generated at fixed receiver 16 by subtracting the signal $f$ as received at fixed receiver 16 from fixed transmitter 10 from the signal $(f + a)$ as received at fixed receiver 16 from fixed transmitter 12. Thus, the phase of the signal $a_1$ is the difference in the phase of these two signals as received at fixed receiver 16. The phase of the signal of frequency $f$ as received at fixed receiver 16 is given by the expression $(\phi_{10} + k_1 A)$, where $\phi_{10}$ is the phase of the signal as broadcast by transmitter 10, $k_1$ is the phase-shift per unit distance that the signal of frequency $f$ experiences when being transmitted and A is, of course, the distance between the fixed transmitter 10 and fixed receiver 16. Similarly, the phase of the signal of frequency $(f + a)$ as received at fixed receiver 16 is given by the expression $(\phi_{12} + k_2 B)$. Thus, the phase of the signal $a_1$, which is the difference in the two above expressions, is given by the following equation:

$$\phi_{a_1} = (\phi_{12} + k_2 B) - (\phi_{10} + k_1 A) \tag{1}$$

$$= \phi_{12} + k_2 B - \phi_{10} - k_1 A \tag{2}$$

In a similar manner, and using the same conventions used in the expressions and equations above, the phase of the signal $b_1$ may be represented by the following equations:

$$\phi_{b_1} = (\phi_{14} + k_3 C) - (\phi_{10} + k_1 A) \tag{3}$$

$$= \phi_{14} + k_3 C - \phi_{10} - k_1 A \tag{4}$$

and the phases of the signals $a_2$ and $b_2$ as developed at mobile receiver 18 can be represented by the following equations:

$$\phi_{a_2} = (\phi_{12} + k_2 Y) - (\phi_{10} + k_1 X) \tag{5}$$

$$= \phi_{12} + k_2 Y - \phi_{10} - k_1 X \tag{6}$$

$$\phi_{b_2} = (\phi_{14} + k_3 Z) - (\phi_{10} X. k_1 X) \tag{7}$$

$$= \phi_{14} + k_3 Z - \phi_{10} - k_1 X. \tag{8}$$

Referring now to FIG. 2, the signals $a_1$, $a_2$, $b_1$ and $b_2$ are transmitted to a common location for further processing to determine the position of the mobile receiver 18. Conveniently, the signals $a_1$ and $b_1$ may be transmitted by any suitable means to the location of mobile receiver 18 for processing there with the signals $a_2$ and $b_2$, although if desired the signals $a_2$ and $b_2$ could be transmitted to the location of the fixed receiver 16, or all four signals could be transmitted to some other location for subsequent processing. Such transmission might alter the phase of the signals being transmitted, but it would alter them all in the same degree, so the following description of FIG. 2, which is dependent only upon phase differences, not absolute phase, assumes that the phases of all four signals are as given in the equations above.

As is shown in FIG. 2, two phase meters 28 and 30 are provided. These are known phase meters of the type which, when two signals of the same frequency are applied to their input terminals, indicates the difference in the phases of the two signals. The signals $a_1$ and $a_2$ are provided to the input terminals 32 and 34 respectively of phase meter 28, while the signals $b_1$ and $b_2$ are provided to the input terminals 36 and 38 respectively of phase meter 30. Phase meter 28 thus gives a reading indicated by the expression $(\phi_{a1} - \phi_{a2})$. Substituting the above equations for these values yields the following expressions:

$$\phi_{28} = (\phi_{12} + k_2 B - \phi_{10} - k_1 A) - (\phi_{12} + k_2 Y - \phi_{10} - k_1 X) \tag{9}$$

$$= k_2 B - k_1 A + k_1 X - k_2 Y \tag{10}$$

$$= k_4 + k_1 X - k_2 Y \tag{11}$$

where $k_4$ is equal to $k_2 B - k_1 A$. Those skilled in the art will immediately recognize that equation 11 above defines a family of hyperbolas having as their foci the location of the fixed transmitters 10 and 12, and that if the mobile receiver 18 is maneuvered in such a manner that the phase meter 28 reading is maintained constant, the mobile receiver 18 will be following the path of one of these hyperbolas which is defined by equation 11.

This family of hyperbolas forms the hyperbolic lines of position described above.

Similarly, the reading of the phase meter 30, which is given by the expression $(\phi_{b1} - \phi_{b2})$, is given by the following equations:

$$\phi_{30} = (\phi_{14}+k_3C-\phi_{10}-k_1A) - (\phi_{14}+k_3Z-\phi_{10}-k_1X) \quad (12)$$

$$= k_3C - k_1A + k_1X - k_3Z \quad (13)$$

$$= k_5 + k_1X - k_3Z \quad (14)$$

where $k_5$ is equal to $k_3C - k_1A$. Again, those skilled in the art will recognize that equation 14 defines a second family of hyperbolas having as their foci the locations of fixed transmitters 10 and 14, and that if mobile receiver 18 is maneuvered such that the reading of phase meter 30 is maintained constant, the mobile receiver 18 will be following the path of one of these hyperbolic isophase lines of position defined by equation 14.

It will also be noticed that the above equations 11 and 14 show that the readings of phase meters 28 and 30 are independent of $\phi_{10}$, $\phi_{12}$ and $\phi_{14}$, which is the phases of the signals as transmitted by the fixed transmitters 10, 12 and 14. Thus, this shows that there is no need to synchronize the phases of these transmitters.

FIG. 2 also shows that the shaft output of phase meter 28 is connected to a mechanical differential 40 and through a reversing gear 42 to a mechanical differential 44. The shaft output of phase meter 30 is also connected directly to mechanical differentials 40 and 44. Mechanical differentials 40 and 44 are known mechanical components which have two input shafts and an output shaft, with the output shaft being at an angle equal to the sum of the angles of the input shafts. Differential 40 drives a meter 46 which indicates the angular position of the outut shaft differential 40 and differential 44 drives a meter 48 which indicates the angular position of the output shaft of differential 44. The reading of meter 46 may be represented by the following equations:

$$\phi_{46} = \phi_{28} + \phi_{30} \quad (15)$$

$$= (k_4+k_1X-k_2Y) + (k_5+k_1X-k_3Z) \quad (16)$$

$$= k_6 + 2k_1X - k_2Y - k_3Z \quad (17)$$

where $k_6$ is equal to $k_4 + k_5$. Similarly, the reading of meter 48 may be indicated by the following equations:

$$\phi_{48} = \phi_{30} - \phi_{28} \quad (18)$$

$$= (k_5 + k_1X - k_3Z) - (k_4 + k_1X - k_2Y) \quad (19)$$

$$= k_7 + k_2Y - k_3Z \quad (20)$$

where $k_7$ is equal to $k_5 - k_4$.

It is seen that equation 20 above is of the same general type as equations 11 and 14 above and thus equation 20 defines a family of hyperbolas having as their foci the location of the fixed transmitters 12 and 14. Accordingly, if the mobile receiver 18 is maneuvered such that the reading of meter 48 remains constant, the mobile receiver 18 will be following a course which defines one of the isophase hyperbolas in this family of hyperbolas, and that, conversely, the reading of meter 48 indicates a particular hyperbolic line of position along which mobile receiver 18 is located at that particular instant.

Figure 3:
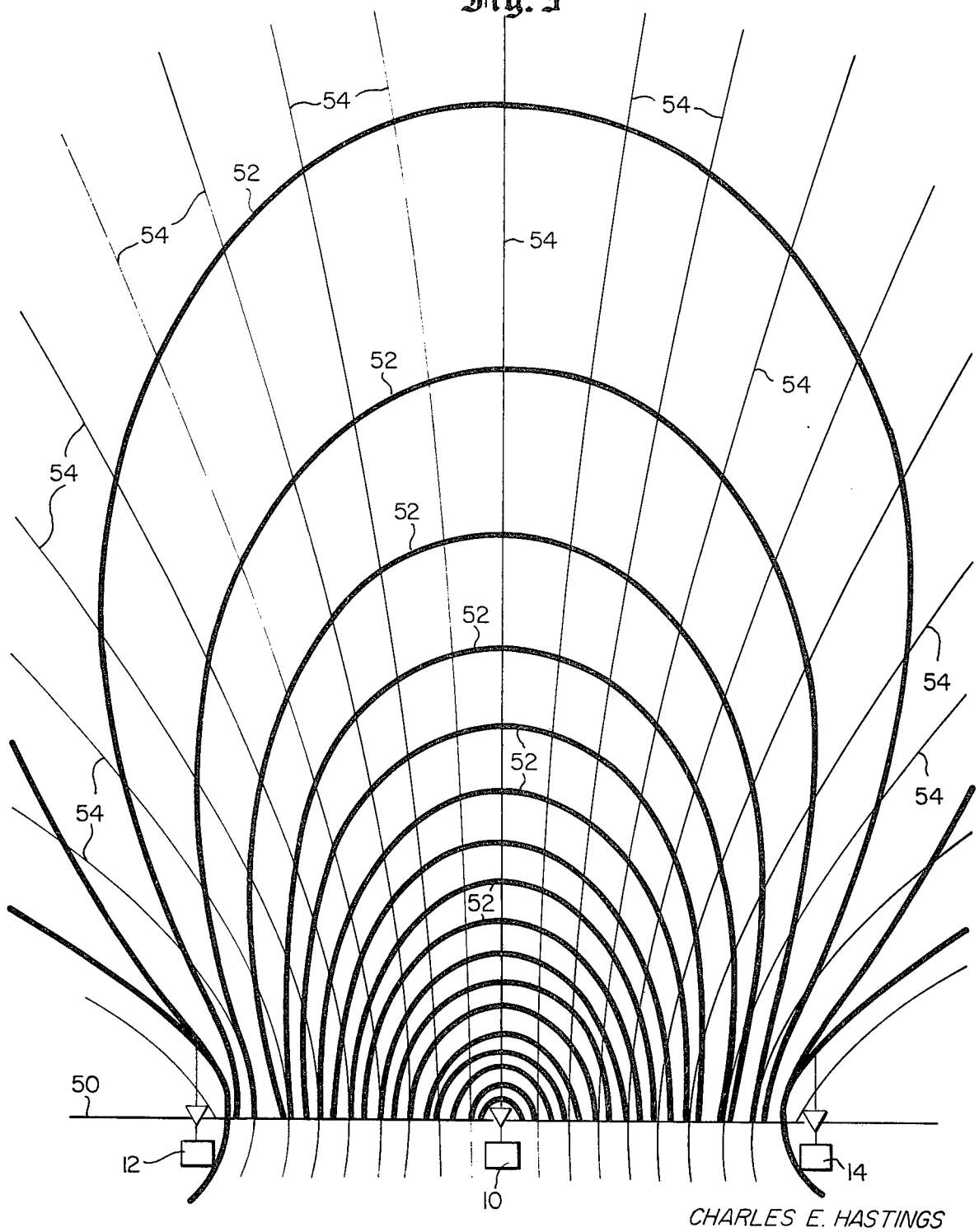
FIG. 3 shows a plot of the lines of position yielded by the system of FIGS. 1 and 2.

Equation 17, which represents the reading of meter 46 is not of this same general type and does not define a family of hyperbolas. However, equation 17 does define a family of curves of the same general shape and whose position is determined by the location of the fixed transmitters 10, 12 and 14. FIG. 3 shows, among other things a plot of such a family of curves. FIG. 3 shows the fixed transmitters 10, 12 and 14 located along a base line 50 and a plurality of curves 52. Each of these curves represents a path along which mobile receiver 18 would be navigating if it were maneuvered so that the output reading of meter 46 is maintained constant. Thus, the generic equation for the family of curves 52 may be stated as being:

$$K_1, K_2 \ldots K_n = N_1X - N_2Y - N_3Z \quad (21)$$

where $K_1, K_2 \ldots K_n$ represents particular constant readings of the meter 46, $N_1$, $N_2$ and $N_3$ are constant and $X$, $Y$ and $Z$ are, as before, the distances between the mobile receiver 18 and the fixed transmitters 10, 12 and 14 respectively. As far as applicants know, there is no generic name in mathematics for this family of curves. However, since this family of curves is referred to frequently in the discussion below, it is useful to have a name for them, and hereinafter such curves are referred to as "halops".

FIG. 3 also shows a family of hyperbolas 54 superimposed over the family of halops 52. The hyperbolas 54 represent the family of hyperbolas defined by equation 20 above and thus are indicative of lines of constant output of the meter 48. The meters 46 and 48 thus define two separate and independent lines of position along which the mobile receiver 18 is positioned at any given instant. Thus, by knowing both of these readings, and by comparing them to previously prepared hyperbolic and halops charts associated with the particular transmitting stations 10, 12 and 14, a definite fix or position of the mobile receiver 18 may be established. It is observed from the superimposed curves of FIG. 3 that over a large portion of the plot, the halops 52 and hyperbolas 54 intersect each other at relatively large angles, frequently being substantially normal to each other at the point of intersection. Thus, it is much easier to get an extremely accurate fix of the position of the mobile receiver 18, and the system is not subject to the short-comings of pure hyperbolic-hyperbolic systems described above when the mobile receiver 18 is operating in a region where the intersections of the hyperbolas are at small angles.

Another useful feature of the halops curves described above is that, if a family of halops curves are plotted at each of which the angle of the indicator of meter 46 is the same, such as a family of halops curves for each of which the meter 46 reads 0°, only a finite number of halops curves are generated, with this number being a function of the spacing between the fixed transmitters 12 and 14 and of the frequency of the highest signal being used in the system. The number of such curves is equal to the number of half-wavelengths of this highest frequency which separate the transmitting stations 12 and 14. For example, if the signal having the frequency $(f + b)$ is the highest frequency in the system, and the spacing between transmitting stations 12 and 14 is 40 half-wavelengths of this frequency, then a family of 40 such halops curves is generated by the system. However, the outer-most halops curve can be disregarded, since it lies along a great circle of the earth passing along the base line 50 of the system, and thus there are effectively 39 such halops curves in the family. This feature of the halops curves may be used to provide a precise lane identification in which a craft carrying the mobile receiver 18 is located at a particular instant. This feature is particularly useful to such a craft if it is entering the area in which the system is operating from a point of origin outside of the system. By observing when the craft crosses the outermost, or thirty-ninth halops curve, and by counting subsequent crossings of halops lines of positions, a navigator on the craft can provide a precise identification of what lane the craft is in at a given instant. In contrast to this, if such a craft entered a pure hyperbolic-hyperbolic system from a point of origin outside the area in which the system is operating, a navigator on the craft can observe his instruments and be aware that he is crossing hyperbolic lines of position, thus moving from one lane into another in the system, but he has no way of knowing into which lane he entered when he first entered the area in which the system is operating, and thus, even though he tracks the number of lanes that he is crossing, he needs some independent verification of his position at some time to definitely establish a fix in the system.

Figure 4:
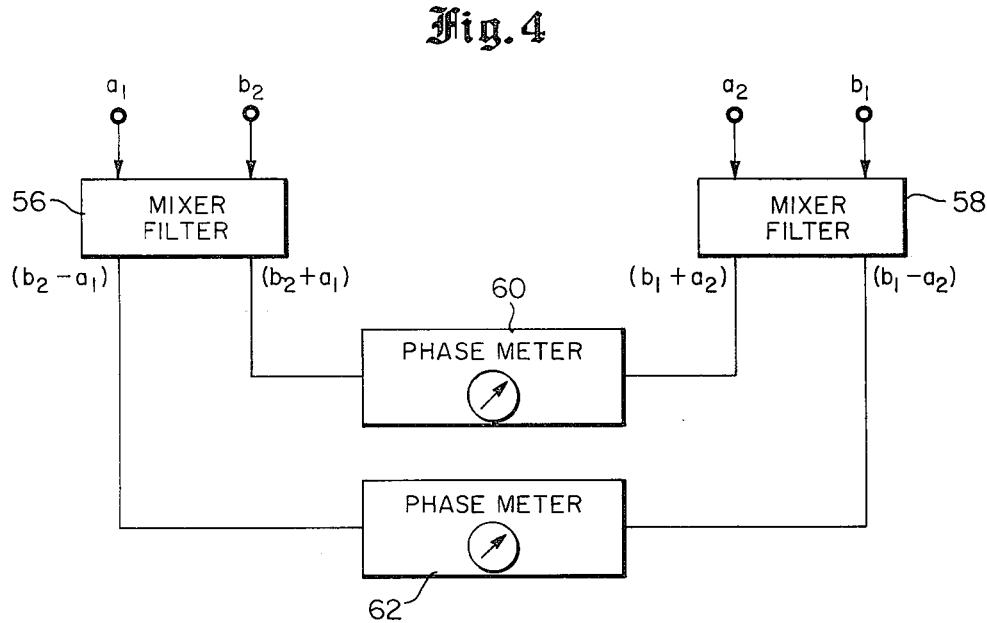
FIG. 4 shows an alternate embodiment of the system of FIGS. 1 and 2.

FIG. 4 shows a second embodiment of a signal processing unit which may be substituted for the signal processing unit of FIG. 2 to generate the hyperbolic line of position and halops line of position information directly without passing through the intermediate state of first developing hyperbolic lines of position with regard to transmitting stations 10 and 12 and hyperbolic lines of position with regard to transmitting stations 10 and 14. In the embodiment of FIG. 4, a pair of mixer-filter elements 56 and 58 are provided. The signals $a_1$ and $b_2$ are applied to mixer-filter 56, which heterodynes these frequencies together to obtain a sum and difference frequency signal, in the manner well known to those skilled in the art. In a similar manner, the signals $a_2$ and $b_1$ are applied to mixer-filter 58, in which they are heterodyned together to obtain the sum and difference frequencies as shown in FIG. 4. These output signals from mixer-filters 56 and 58 are then applied to phase meters 60 and 62. As is shown in the analysis below, the output of phasemeter 60 defines the position of the mobile receiver 18 with respect to the hyperbolic lines of position of FIG. 3 and the output phasemeter 62 defines the position with respect to the halops lines of position of FIG. 3.

The output reading of phase meter 60 is determined by the difference in the phases of the signals on its two input lines, and this difference is represented by the following equation:

$$\phi_{60} = (\phi_{b_1} + \phi_{a_2}) - (\phi_{b_2} + \phi_{a_1}) \qquad (22)$$

$$[(\phi_{14}+k_3C-\phi_{10}-k_1A)+(\phi_{12}+k_2Y-\phi_{10}-K_1X)]-[(\phi_{14}+k_3Z-\phi_{10}-k_1X)+(\phi_{12}+k_2B-\phi_{10}-k_1A)] \qquad (23)$$

$$= k_7 + k_2Y - k_3Z \qquad (24)$$

It is seen that equation 24, which represents the output of phase meters 60, is identical to equation 20 above, and thus the output of phase meter 60 is identical to the output of meter 48 of FIG. 2, with each of these outputs representing the hyperbolic lines of position 54 of FIG. 3.

Similarly, the output of phase meter 62 may be represented by the following equations:

$$\phi_{62} = (\phi_{b_1} - \phi_{a_2}) - (\phi_{b_2}-\phi_{a_1}) \qquad (25)$$

$$= [(\phi_{14}+k_3C-\phi_{10}-k_1A)-(\phi_{12}+k_2Y-\phi_{10}-K_1X)]-[(\phi_{14}+k_3Z-\phi_{10}-k_1X)-(\phi_{12}+k_2B-\phi_{10}-k_1A)] \qquad (26)$$

$$= k_6 + 2k_1X - k_2Y - k_3Z \qquad (27)$$

It is seen that equation 27 is identical to equation 17 above, and thus that the reading of phase meter 60 is identical to the reading of meter 46 in FIG. 2. Thus, both of these meters show the position of the mobile receiver 18 with respect to the halops lines of positions of FIG. 3, and it is seen that the signal processing unit of FIG. 4 is functionally interchangeable with that of FIG. 2.

Figure 5:
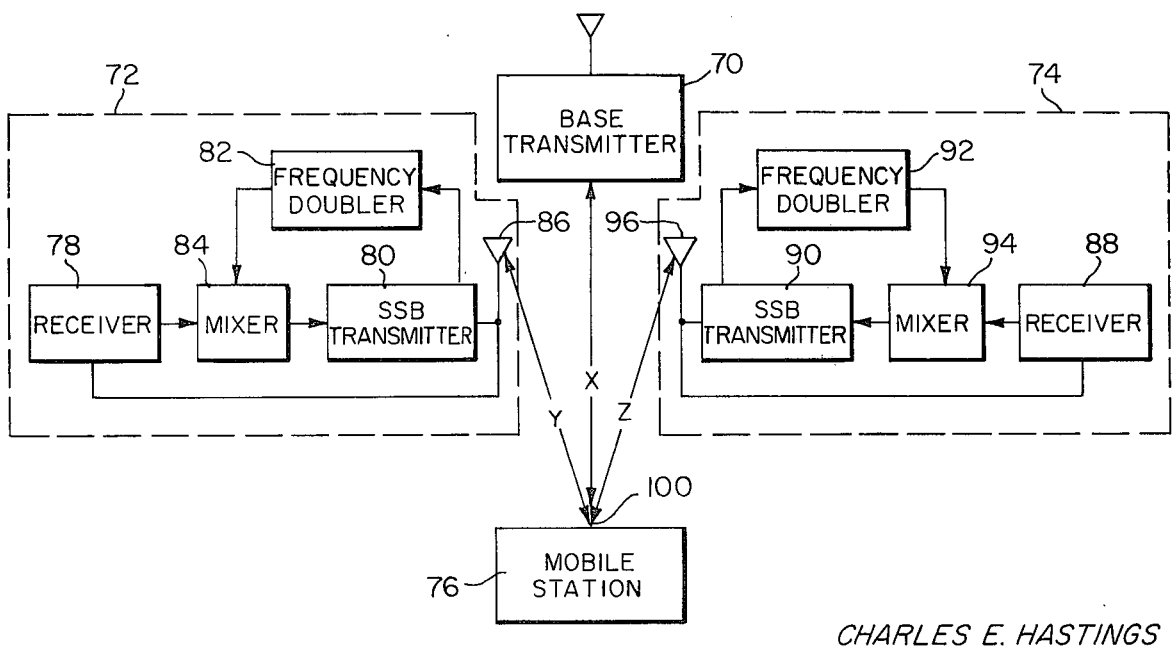
FIG. 5 shows a block diagram of a second radio navigation system incorporating the present invention.

FIG. 5 shows the block diagram of another isophase line of position navigation system embodying the present invention but which does not require the fixed receiver of the embodiment of FIGS. 1 and 2. The system includes a base transmitter 70 which broadcasts a continuous wave signal of predetermined frequency and independent phase, a first relay station 72 and a second relay station 74, each of which receives the signal broadcast by the base transmitter 70 and rebroadcasts their own signals, and a mobile station 76 which might be located on a craft whose position is to be determined.

First consider the structure and operation of the relay stations, of which relay station 72 is typical. It includes a receiver 78 which receives the signal broadcast by the base transmitter 70, and a signal sideband transmitter 80 which includes an oscillator circuit for generating a first carrier signal. The frequency of this oscillator differs from one-half the frequency of the signal generated and broadcast by the base transmitter 70 by an amount equal to one-half of a second predetermined frequency. This first carrier frequency as generated in single sideband transmitter 80 is applied to a frequency doubler 82 whose output is applied to a mixer 84 which also receives the signal from base transmitter 70 received by receiver 78. The output of mixer 84, which is a first modulating signal having the above mentioned second predetermined frequency, is applied to the single sideband transmitter as a modulating signal to be transmitted as a single sideband modulation through antenna 86 to the mobile station 76.

In a typical embodiment, the first predetermined frequency of the base transmitter 70 is 3302.400 kHz, the second predetermined frequency is 370 Hz, thus the frequency of the oscillator of the single sideband transmitter 80 is 1651.015 kHz. The first modulating signal is modulated as a lower sideband frequency onto the carrier frequency in single sideband transmitter 80, which thus transmits its carrier signal of 1651.015 kHz and its lower sideband modulated signal of 1650.645 kHz through antenna 86. The 370 Hz modulating signal may be thought of as being analogous with the signal a of the system of FIGS. 1 and 2.

Relay station 74 is similar to relay station 72, and includes a receiver 88 for receiving the signal from base transmitter 70, a second single sideband transmitter 90, a frequency doubler 92, a mixer 94 and an antenna 96. In the typical embodiment described above, the other predetermined frequency or audio frequency of this second relay station 74 might be 450 Hz, and thus frequency of the oscillator generating the second carrier signal of single sideband transmitter 90 would be 1651.425 kHz, which when doubled and heterodyned with the output signal from receiver 88 yields a second modulating signal having a frequency of 450 Hz as the output signal from mixer 94. This signal, which might be thought of as being analogous to the signal b in the embodiment of FIGS. 1 and 2, is modulated onto the carrier signal of single sideband transmitter 90 as an upper sideband modulated signal having a frequency of 1651.875 kHz.

It is noted that the carrier frequencies of the single sideband transmitters 80 and 90 are slightly above and slightly below, respectively, one-half of the frequency of the base transmitters 70. The lower frequency of these two transmitters, single sideband transmitter 80, is then modulated with an audio frequency signal on a lower sideband, while the higher frequency of the two transmitters, single sideband transmitter 90, is modulated on its upper sideband with an audio frequency signal. Thus, by this frequency arrangement, the two single sideband transmitters can operate within a single frequency allocation, and because these frequencies are essentially one-half of the frequency of the base transmitter 70, the same antennas may be used to broadcast or receive all of the frequencies.

Figure 6:
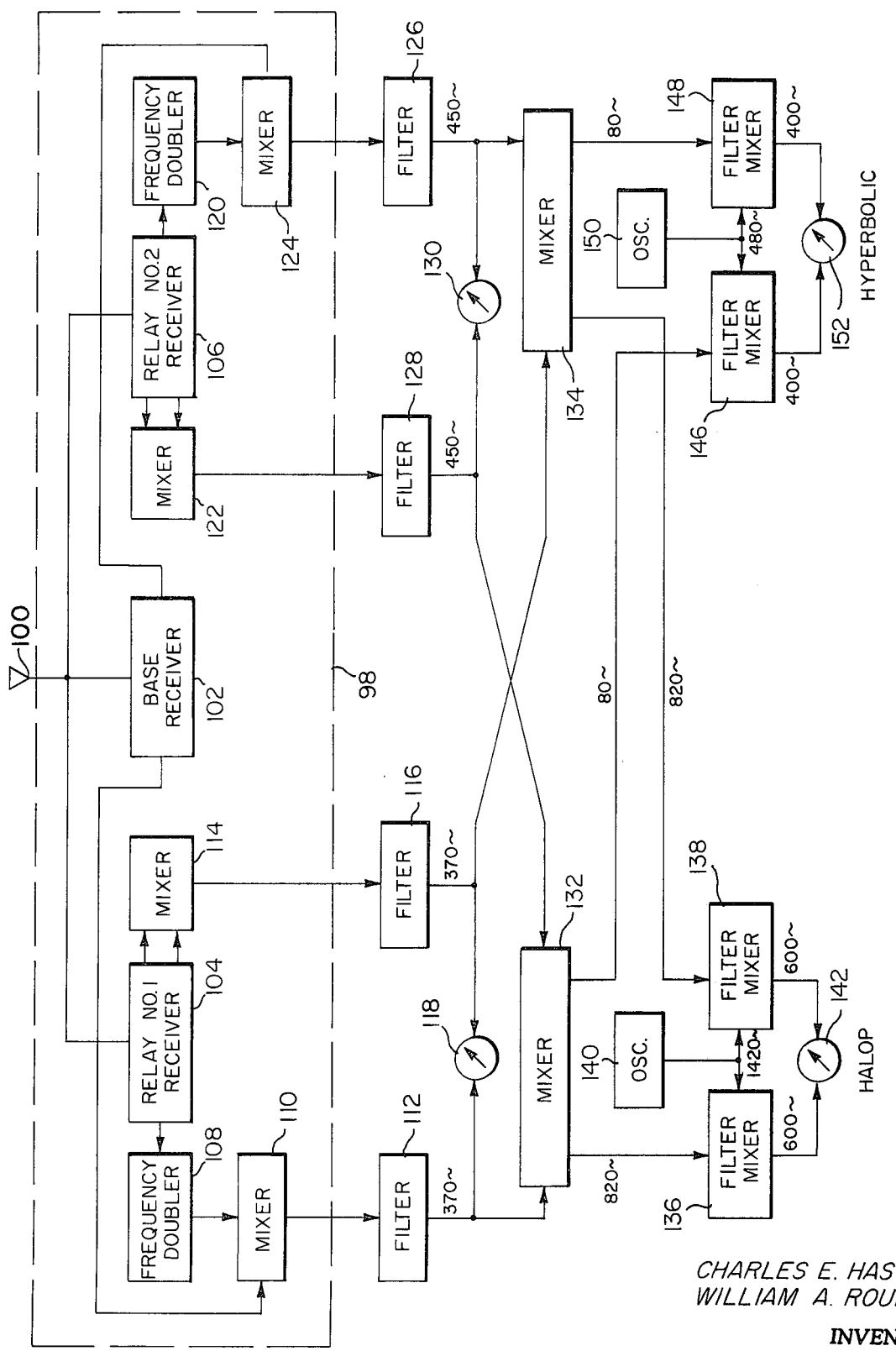
FIG. 6 shows a block diagram of a mobile station which may be used in the system of FIG. 5.

FIG. 6 shows a block diagram of a mobile station 76 which can be used in the system of FIG. 5. The mobile station 76 includes a main receiver 98 which receives all of the signals broadcast by the base transmitter 70 and the relay stations 72 and 74 on a common antenna 100. Antenna 100 feeds a base receiver 102 which receives the signals transmitted by base transmitter 70, a first relay receiver 104 which receives the carrier and single sideband modulation signals being transmitted by the first relay station 72 and a second relay receiver 106 which receives the carrier and single sideband modulation signal being transmitted by the second relay station 74.

Relay receiver 104 separates the first carrier signal and the lower sideband signal being transmitted from first relay station 72 in the manner well known to those skilled in the art. Relay receiver 104 then feeds the recovered carrier signal to a frequency doubler 108 which doubles this frequency and in turn feeds it to a mixer 110 which also receives as an input signal the signal received by the base receiver 102. Mixer 110 heterodynes these two signals in the manner well known to those skilled in the art, and produces a first control signal having a frequency of 370 Hz and whose phase is a function of the phases of the signals as generated in base transmitter 70 and single sideband transmitter 80 and of the distances from base transmitter 70 and relay station 72 to mobile station 76. These distances are designated as X and Y respectively in FIG. 5. This first control signal is then fed through a 370 Hz filter 112.

The relay receiver 104 also feeds both the recovered carrier signal and the recovered lower sideband signal into a mixer 114, which heterodynes these signals and produces a second control signal whose frequency is 370 Hz and whose phase is dependent upon the phase of the signals as generated in base transmitter 70 and single sideband transmitter 80 and also dependent upon the distance Y. This second control signal is fed through a 370 Hz filter 116. The output signal from filters 112 and 116 are connected to control a phase meter 118, which indicates the difference in the phases of these signals, and thus provides a first position indicating signal for mobile station 76. If desired, one having ordinary skill in the art could go through a derivation of the phases of the signals in the manner similar to that done in connection with the description of FIGS. 1 through 4 above, and it would be seen that the effect of the phases of the signals as generated in base transmitter 70 and single sideband transmitter 80 cancel out and that phase meter 118 shows hyperbolic lines of position of a family of hyperbolas having as their foci the locations of base transmitter 70 and first relay station 72. For clarity and brevity, the derivation of these phase equations is omitted.

The second relay receiver 106 similarly receives the signals being broadcast by second relay station 74 and feeds these signals into a frequency doubler 120 and a mixer 122 comparable in function to frequency doubler 108 and mixer 114. The output of frequency doubler 120 is in turn fed into a mixer 124 which also receives as an input the output signal of base receiver 102. Mixer 124 then provides a third control signal having a frequency of 450 Hz to filter 126 and mixer 122 provides a fourth control signal having a frequency of 450 Hz to filter 128. In a manner similar to that described above, the third and fourth control signal outputs of filters 126 and 128 are fed to a phase meter 130, which thus provides a second position indicating signal indicating the location of mobile station 76 on hyperbolic lines of position which have as their foci the locations of base transmitter 70 and relay station 74.

The 370 Hz first control signal from filter 112 and the 450 Hz fourth control signal from filter 128 are also fed to a mixer 132. In a similar manner, the 370 Hz second control signal of filter 116 and the 450 Hz third control signal of filter 126 are fed to a similar mixer 134. Each of the mixers 132 and 134 thus has an output signal which is the sum of the input signals, which is an output signal having a frequency of 820 Hz and an output signal which is the difference of the input signals, which is an output signal having a frequency of 80 Hz.

The 820 Hz output signal of filter mixer 132, which may be termed the fifth control signal, is fed to a filter-mixer 136. Similarly, the 820 Hz output signal of mixer 134, the sixth control signal, is fed to a filter-mixer 138. Each of the filter mixers 136 and 138 also receives as its other input the output signal of a local oscillator 140, which in a representative embodiment has a frequency of 1420 Hz. These signals are filtered and mixed in filter-mixers 136 and 138 such that each of them has an output signal having a frequency of 600 Hz. These output signals are then fed to a phase meter 142, which provides a third position indicating signal for mobile station 76.

Mixers 132 and 134 and the filter arrangement just described effectively add the hyperbolic readings, or first and second position indicating signals, given on phase meters 118 and 130 such that the third position indicating signal of phase meter 142 indicates the location of mobile station 76 along a halops line of position about the locations of fixed stations 70, 72 and 74, such as is shown in FIG. 3. If desired, one skilled in the art can derive the phase equations of the resultant signals which are applied to phase meter 142, and it would be seen that their equation is similar to that given in equation 27 above. However, again for clarity and brevity, this somewhat involved phase derivation, which is merely a mathematical exercise, is omitted.

Similarly, the 80 Hz output signal from the mixer 132, which may be termed the seventh control signal, is fed to a filter-mixer 146 and the 80 Hz output signal of mixer 134, the eighth control signal, is fed to a filter-mixer 148. Again, a local oscillator 150, which in a representative embodiment might have a frequency of 480 Hz, also feeds filter-mixers 146 and 148 such that the output signals of these two elements each has a frequency of 400 Hz. These output signals are then fed to a phase meter 152, which shows a fourth position indicating signal which is the difference in the first and second position indicating signal. Phase meter 152 is effective to indicate the location of the mobile station 76 along hyperbolic lines of position which have as a foci the locations of relay station 72 and 74, which hyperbolic lines of position are similar to those shown in FIG. 3. Again, the mathematical derivation of the reading of phase meter 152 is omitted for clarity.

Thus, together the halops phase meter 142 and the hyperbolic phase meter 152 provides a definite fix of the location of the mobile station 76 in relation to the locations of base transmitter 70 and relay stations 72 and 74.

Figure 7:
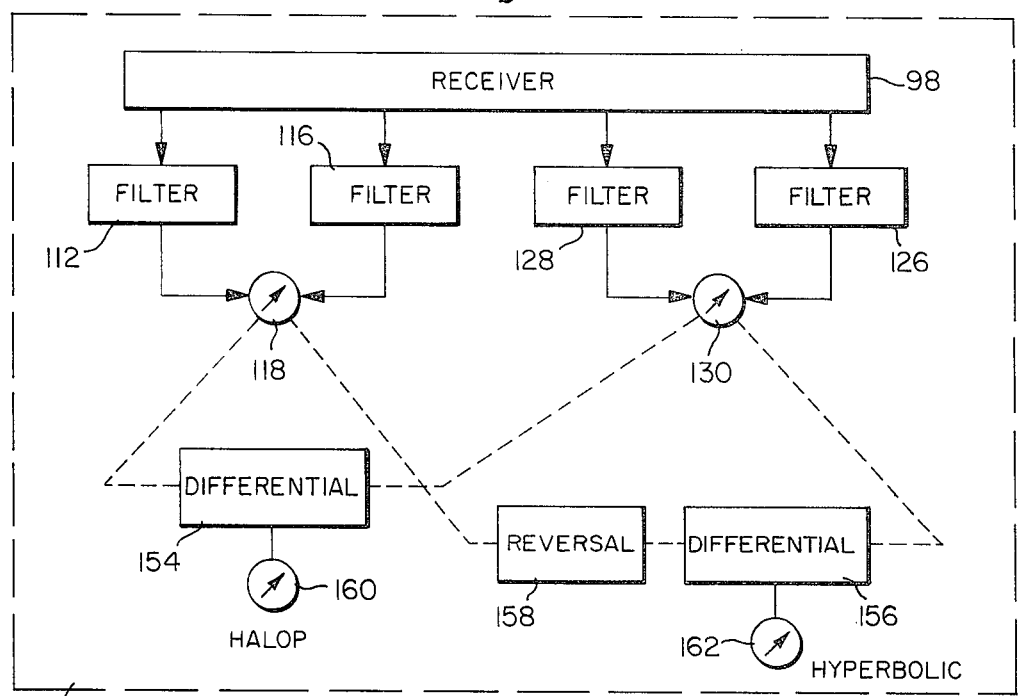
FIG. 7 shows a block diagram of a second mobile station which may be used with the system of FIG. 5.

FIG. 7 shows an alternate mobile station 76 which may be used in the system of FIG. 5 if desired. In FIG. 7 the elements bear the same reference numerals as the corresponding elements in FIG. 6. However, the phase meters 118 and 130, which provide hyperbolic lines of position information with respect to base station 70 and relay station 72 and with respect to base station 70 and relay station 74 respectively, are mechanically coupled to a differential and gear reversal arrangement similar to that described in detail in connection with FIG. 2 above. Differential 154 receives its inputs directly from the shafts of phase meters 118 and 130 and drives a meter 160 which, in the manner described in FIG. 2 above, provides a halops line of position indication. Similarly, the output of phase meter 118 is connected through a reversal 158 to a mechanical differential 156, which receives its other input from the shaft of phase meter 130. Differential 156 in turn drives meter 162 which indicates the location of mobile station 76 along hyperbolic lines of position which have as their foci the locations of relay stations 72 and 74.

Figure 8:
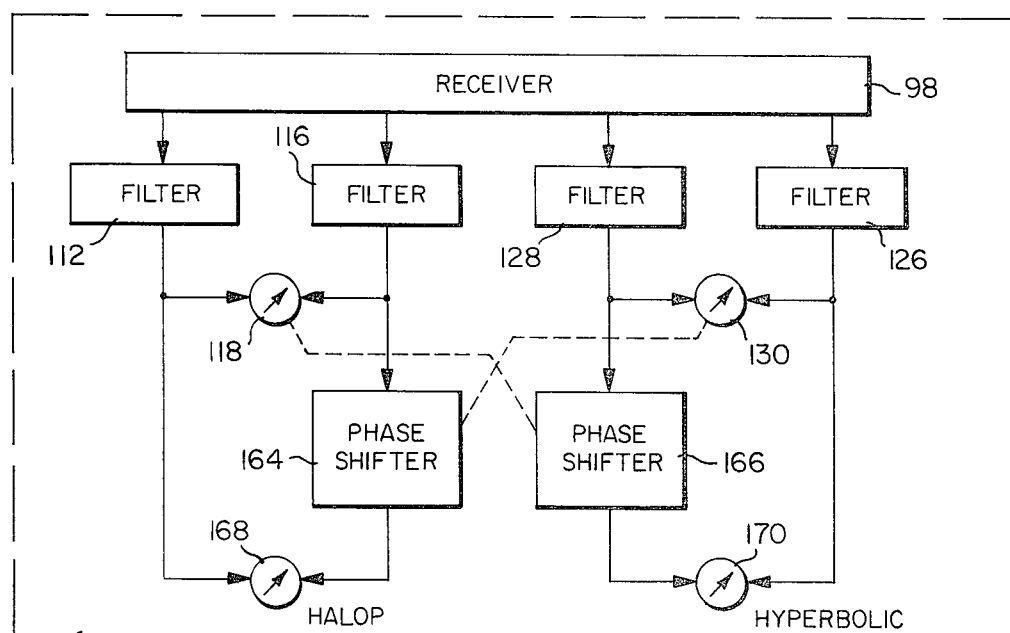
FIG. 8 shows a block diagram of a third mobile station which may be used with the system of FIG. 5.

FIG. 8 shows yet another embodiment of the mobile station 76 which can be used with the system shown in FIG. 5. Again, in FIG. 8 similar elements in mobile station 76 have the same reference numeral as in FIG. 6. However, in this embodiment a phase shifter 164 is provided which receives as its electrical input the second control signal from filter 116. The phase shifter 164 is also mechanically driven by phase meter 130 in such a manner as to advance the phase of the output signal of phase shifter 164 as the reading of phase meter 130 advances. Phase shifter 164 as so driven thus serves to "add" the reading of phase meter 130 to that of phase meter 118. Phase meter 168 is connected across both phase meter 118 and phase shifter 164 and thus serves to indicate these "added" phases. Thus, phase meter 168 indicates the location of mobile station 76 along a halops line of position.

Similarly, phase shifter 166 is connected to receive as its electrical input the fourth control signal from filter 128. However, the mechanical input to phase shifter 166, which is received from phase meter 118, is connected such that the amount of phase shift introduced by phase shifter 166 is reduced as phase meter 118 advances. Thus, phase shifter 166 serves to "subtract" the reading of phase meter 118 from that of phase meter 130. Phase meter 170 is connected across phase shifter 166 and phase meter 130 and thus serves to indicate the location of mobile station 76 along hyperbolic lines of position which have as their foci the location of relay stations 72 and 74.

Figure 9:
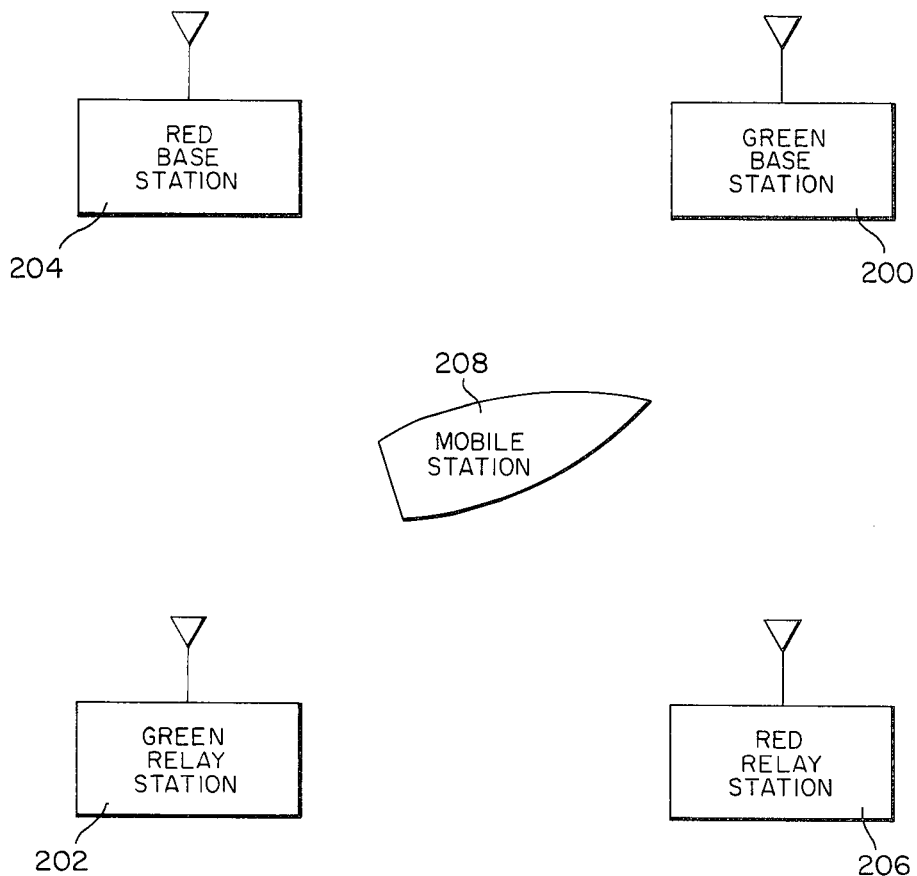
FIG. 9 shows a block diagram of a third radio navigation system which incorporates the present invention.

FIG. 9 shows a block diagram of yet another system embodying the present invention. In this system, completely independent hyperbolic lines of position are generated. By this it is meant that each of the families of hyperbolic lines of position is completely independent of the other family of hyperbolic lines of position. This is achieved by generating each family of hyperbolic lines of position from an independent base and relay station, thus having no common station such as is used in all of the systems described above. FIG. 9 shows a first base station 200, designated the "green" station and a first relay station 202, designated the green relay station. Also shown is a second base station 204, designated the "red" base station, and a second relay station 206, designated the red relay station. Each of the base stations 200 and 204 may be like the base station 70 described in FIG. 5 above and each of the relay stations 202 and 206 may be like the relay stations 72 and 74 described in FIG. 5 above. Preferably, the base stations 200 and 204 both transmit continuous wave signals within a single frequency allocation but sufficiently different to allow separation. It is noted that the stations are designated red and green only for identification. FIG. 9 also shows a mobile receiver 208 whose position is to be determined within or fairly closely adjacently to the quadrilateral formed by the stations 200, 204, 202 and 206.

Figure 10:
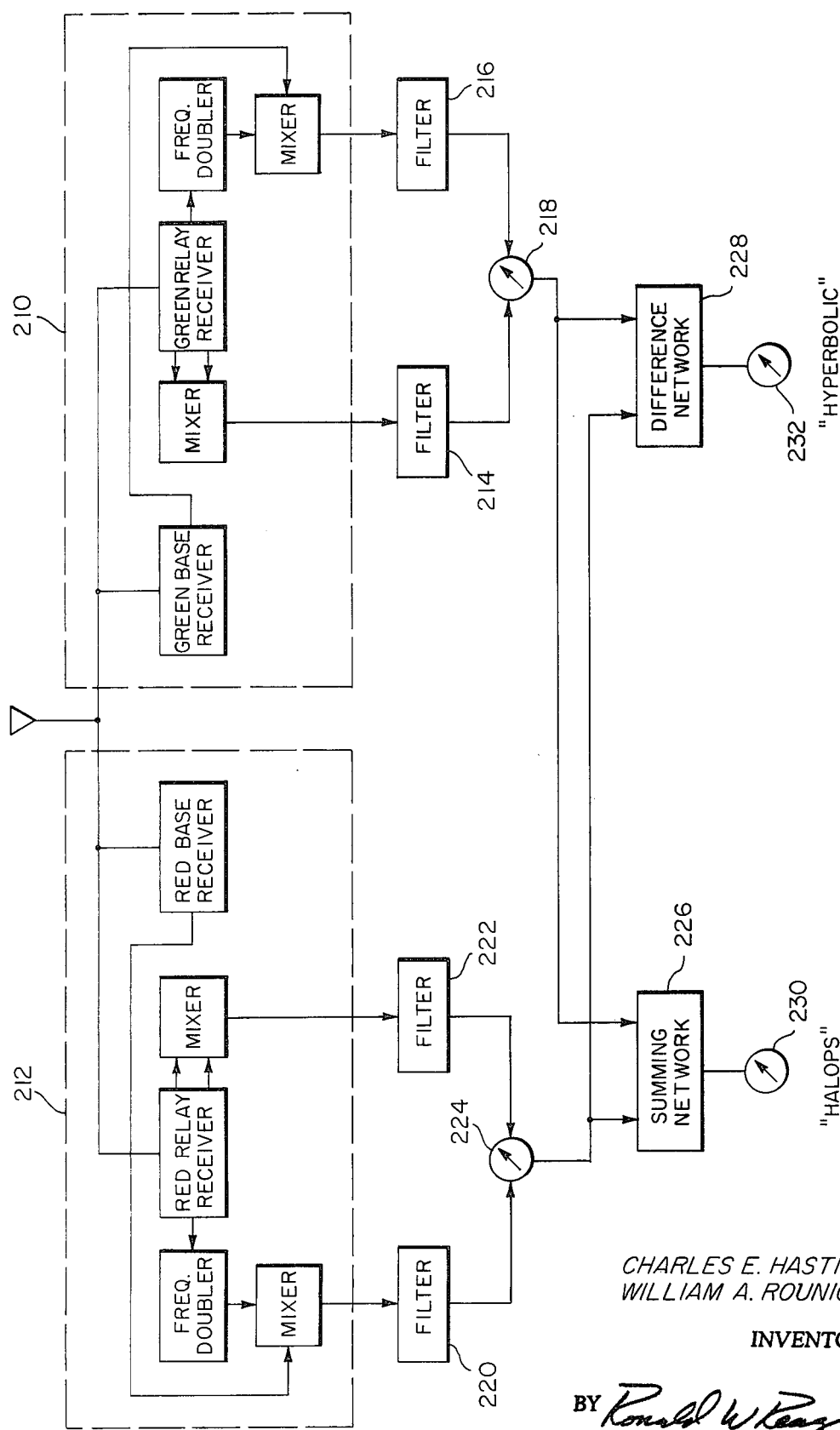
FIG. 10 shows a block diagram of the mobile station of the system of FIG. 9.

Details of the mobile receiver 208 are shown in FIG. 10. In general, the mobile station 208 is similar to mobile station 76 of FIGS. 6, 7 and 8. However, since it is now receiving signals from four stations instead of three, it includes a separate main green receiver 210 and a main red receiver 212. Green receiver 210 provides first and second control signal outputs through filters 214 and 216 respectively, which, when applied to phase meter 218 yield a hyperbolic line of position which has as its foci the location of the green base station and the green relay station. The operation of this position of the mobile station is the same as that described in FIG. 6 above, so details of the operation are not repeated here.

Similarly, red receiver 212 provides third and fourth control signal outputs through filters 220 and 222 respectively, which, when applied to phase meter 224 provide a hyperbolic line of position which has as its foci the locations of the red base station and the red relay station.

The outputs of the phase meters 218 and 224 are each connected to a summing network 226 and a difference network 228, which networks respectively drive meters 230 and 232 to indicate the "sums" and the "difference" in the readings of the hyperbolic line of position phase meters 218 and 224. The summing network 226 and difference network 228 may be either electrical or mechanical means for performing this operation, such as any of the various specific means described in FIGS. 2, 4, 6, 7, or 8 above, or any other suitable means such as are known to those skilled in the art.

The output of meters 230 and 232 are analogous to the halops and hyperbolic outputs, respectively, in the systems described in FIGS. 1 through 8 above. Thus, the meter 230 may be labeled as halops meter and the meter 232 may be labeled a "hyperbolic" meter. However, if the mobile station is navigated so as to maintain either of these meters at a constant reading, the station will not follow either of the halops lines or the hyperbolic lines of the plots of FIG. 3 above. This is because the two families of hyperbolas which are being manipulated in FIG. 10 do not have a common station. Thus, the general equations for the halops family of curves given in equation 21 above do not describe the output of meter 230. Similarly, the general equation for the family of hyperbolic curves given in equation 20 above do not describe the behavior of meter 232 or define the path taken by the mobile station if it is navigated to maintain meter 232 at a constant reading.

FIG. 11 shows a plot of the paths traveled by the mobile station if it is navigated so as to maintain the readings of either meter 230 or meter 232 constant. FIG. 11 shows the location of the stations 200, 202, 204 and 206 described above and also shows a plot of two families of curves, one of which is substantially horizontal throughout the plot and the other of which is substantially vertical throughout the plot. The substantially horizontal lines are lines of position obtained from the meter 230 and are generally described by the following equation:

$$K_1, K_2 \ldots K_n = N_1W - N_2X + N_3Y - N_4Z \qquad (28)$$

where $W$ is the distance from the mobile station to the green base station 200, $X$ is the distance from the mobile station to the green relay station 202, $Y$ is the distance from the mobile station 208 to the red base station 204 and $Z$ is the distance from the mobile station 208 to the red relay station 206.

Similarly, the substantially vertical lines of position shown in FIG. 11 represent the paths which the mobile station 208 would follow when it is navigated to maintain the reading of meter 232 constant. The general equation for this family of curves is given by the following equation:

$$K_1, K_2 \ldots K_n = N_1W - N_2X - N_3Y + N_4Z \qquad (29)$$

It is observed that throughout the operating range of the system, as shown in FIG. 11, the lines of position obtained from meters 230 and 232 give practically straight lines having practically perfect rectilinear intersections with the lines of position from the other family of curves. Thus, the system is ideally suited for use in areas which can be positioned within a quadrilateral having a transmitter station at each corner thereof, such as a bay or a large lake, or for use over land when the mobile station is carried either by an aircraft or by a land vehicle.

Also, it is noted that in most of the embodiments of the system described above, the navigation system may be used as either a halops-hyperbolic system, that is a system in which one line of position is taken from a family of halops and the other line of position is taken from a family of hyperbolas, or as a hyperbolic-hyperbolic system, since the systems inherently produces sufficient information to be operated in either mode.

While the invention is thus disclosed and several embodiments described in detail, it is not intended the invention be limited to the shown embodiments. Instead, many modifications will occur to those skilled in the art that lie within the spirit and scope of the invention. For example, the system could be modified to provide transmitting stations at the mobile station and receiving stations at the fixed stations. Such a system would still measure the transit time, and thus the distance, between the stations. Also, the "audio" signals modulated onto the carrier signals at the relay stations could be the same frequency if desired. It is accordingly intended that the invention be limited in scope only by the appended claims.

What is claimed is:

1. A radio navigation system for determining the position of a mobile station relative to a plurality of fixed stations, comprising:

a first pair of fixed transmitting stations comprising a base station and a first relay station, a second pair of fixed transmitting stations comprising said base station and a second relay station, said base station comprising means for transmitting a continuous wave signal having a first predetermined frequency, said first relay station comprising a receiver for receiving signals broadcast by said base station, a modulatable transmitter for generating a first carrier signal having a frequency differing from one-half of said first predetermined frequency by an amount equal to one-half of a second predetermined frequency, means for doubling the frequency of said first carrier signal, means for mixing said doubled first carrier signal with the output of said receiver to derive a first modulating signal whose frequency is equal to said second predetermined frequency, and means for applying said first modulating signal to said transmitter, whereby said first relay station transmits said first carrier signal modulated by said first modulating signal, said second relay station comprising a receiver for receiving signals broadcast by said base station, a modulation transmitter for generating a second carrier signal having a frequency differing from one-half of said first predetermined frequency by an amount equal to one-half of a third predetermined frequency, means for doubling the frequency of said second carrier signal, means for mixing said doubled second carrier signal with the output of said receiver to derive a second modulating signal whose frequency is equal to said third predetermined frequency, and means for applying said second modulating signal to said transmitter, whereby said second relay station transmits said second carrier signal modulated by said second modulating signal, a mobile station, first means located at said mobile station for deriving a first position indicating signal indicative of the difference in the distances between said mobile station and each of said first pair of fixed transmitting stations, second means located at said mobile station for deriving a second position indicating signal indicative of the difference in the distances between said mobile station and each of said second pair of fixed transmitting stations, said mobile station including receiving means for receiving the signals transmitted by said transmitting stations and for deriving control signals from the signals so received to control said first means and said second means, summing means for adding said first and second position indicating signal indicative of a first line of position on which said mobile station is located, and difference means for subtracting one of said first and second position indicating signals from the other of said first and second position indicating signals to obtain a fourth position indicating signal indicative of a second line of position on which said mobile station is located.

2. The radio navigation system of claim 1 in which said mobile station includes a main receiver for receiving all of the signals transmitted by said base station and said relay stations, said main receiver comprising:
a base receiver for receiving signals transmitted by said base station,
a first relay receiver for receiving signals transmitted by said first relay station and for recovering said first carrier signal and said first modulating signal,
means for doubling the frequency of said recovered first carrier signal and for mixing said doubled first carrier signal with the output signal of said base receiver, whereby a first control signal having said second predetermined frequency is derived,
and recovered first modulating signal comprising a second control signal having said second predetermined frequency,
a second relay receiver for receiving signals transmitted by said second relay station and for recovering said second carrier signal and said second modulating signal,
means for doubling the frequency of said recovered second carrier signal and for mixing said doubled second carrier signal with the output signal of said base receiver, whereby a third control signal having said third predetermined frequency is derived,
said recovered second modulating signal comprising a fourth control signal having said third predetermined frequency,
and in which said first means comprises means for subtracting the phase of one of said first and second control signals from the phase of the other to derive said first position indicating signal and said second means comprises means for subtracting the phase of one of said third and fourth control signals from the phase of the other to derive said second position indicating signal.

3. The radio navigation system of claim 2 in which:
said summing means comprises means for mixing said first control signal and said fourth control signal to derive a fifth control signal whose frequency is equal to the sum of the frequencies of said first and fourth control signals, means for mixing said second control signal to obtain a sixth control signal whose frequency is equal to the sum of the frequencies of said second and third control signals, and means for subtracting the phase of one of said fifth and sixth control signals from the phase of the other to obtain said third position indicating signal, and
said difference means comprises means for mixing said first and fourth control signals to derive a seventh control signal whose frequency is equal to the difference of the frequencies of said first and fourth control signals, means for mixing said second and third control signals to derive an eighth control signal whose frequency is equal to the difference of the frequencies of said second and third control signals, and means for subtracting the phase of one of said seventh and eighth control signals from the phase of the other to obtain said fourth position indicating signal.

4. The radio navigation system of claim 2 in which:
said first means comprises a first phase meter indicating the difference in the phases of said first and second control signals,
said second means comprises a second phase meter indicating the difference in the phases of said fourth and third control signals,
said summing means comprises means for mechanically adding the shaft angles of the indicators of said first and second phase meters, and
said difference means comprises means for mechanically subtracting the shaft angles of the indicators of said first and second phase meters.

5. The radio navigation system of claim 2 in which:
said first means comprises a first phase meter indicating the difference in the phases of said first and second control signals,
said second means comprising a second phase meter indicating the difference in the phases of said third and fourth control signals,
said summing means comprising a first phase shifter, means for applying said second control signal to said first phase shifter, means for advancing said first phase shifter by the shaft angle of said second phase meter, and means for obtaining said third position indicating signal from the difference in the phases of said first control signal and the output signal of said first phase shifter, and
said difference means comprises a second phase shifter, means for applying said fourth control signal to said second phase shifter, means for retarding said second phase shifter by the shaft angle of said first phase meter, and means for obtaining said fourth position indicating signal from the difference in the phases of said third control signal and the output signal of said second phase shifter.

6. A radio navigation system for determining the position of a mobile station relative to a plurality of fixed stations, comprising:
a first pair of transmitting stations comprising a first base station and a first relay station,
a second pair of fixed transmitting stations comprising a second base station and a second relay station,
said first base station comprising means for transmitting a continuous wave signal having a first predetermined frequency,
said first relay station comprising a receiver for receiving signals broadcast by said first base station, a modulatable transmitter for generating a first carrier signal having a frequency differing from one-half of said first predetermined frequency by an amount equal to one-half of a second predetermined frequency, means for doubling the frequency of said first carrier signal, means for mixing said doubled first carrier signal with the output of said receiver to derive a first modulating signal whose frequency is equal to said second predetermined frequency, and means for applying said first modulating signal to said transmitter, whereby said first relay station transmits said first carrier signal modulated by said first modulating signal,
said second base station comprising means for transmitting a continuous wave signal having a third predetermined frequency,
said second relay station comprising a receiver for receiving signals broadcast by said second base station, and modulatable transmitter for generating a second carrier signal having a frequency differing from one-half of said third predetermined frequency by an amount equal to one-half of a fourth predetermined frequency, means for doubling the frequency of said second carrier signal, means for mixing seaid doubled second carrier signal with the output of said receiver to derive a second modulating signal whose frequency is equal to said fourth predetermined frequency, and means for applying said second modulating signal to said transmitter, whereby said second relay station transmits said second carrier signal modulated by said second modulating signal, a mobile station, first means located at said mobile station for deriving a first position indicating signal indicative of the difference in the distances between said mobile station and each of said first pair of fixed transmitting stations, second means located at said mobile station for deriving a second position indicating signal indicative of the difference in the distances between said mobile station and each of said second pair of fixed transmitting stations, said mobile station including receiving means for receiving the signals transmitted by said transmitting stations and for deriving control signals from the signals so received to control said first means and said second means, summing means for adding said first and second position indicating signal indicative of a first line of position on which said mobile station is located, and difference means for subtracting one of said first and second position indicating signals from the other of said first and second position indicating signals to obtain a fourth position indicating signal indicative of a second line of position on which said mobile station is located.

7. The radio navigation system of claim 6 in which aid mobile station includes a main receiving means for eceiving all of the signals transmitted by said first and econd base station and said first and second relay tations, said main receiving means comprising:

a first base receiver for receiving signals transmitted by said first base station, a first relay receiver for receiving signals transmitted by said first relay station and for recovering said first carrier signal and said first modulating signal, means for doubling the frequency of said recovered first carrier signal and for mixing said doubled first carrier signal with the output signal of said first base receiver, whereby a first control signal having said second predetermined frequency is derived, said recovered first modulating signal comprising a second control signal having said second predetermined frequency, a second base receiver for receiving signals transmitted by said second base station, a second relay receiver for receiving signals transmitted by said second relay station and for recovering said second signal and said second modulating signal, means for doubling the frequency of said recovered second carrier signal and for mixing said doubled second carrier signal with the output signal of said second base receiver, whereby a third control signal having said fourth predetermined frequency is derived, said recovered second modulating signal comprising a fourth control signal having said fourth predetermined frequency, and in which said first means comprises means for subtracting the phase of one of said first and second control signals from the phase of the other to derive said first position indicating signal and said second means comprises means for subtracting the phase of one of said third and fourth control signals from the phase of the other to derive said second position indicating signal.

8. The radio navigation system of claim 7 in which:

said summing means comprises means for mixing said first control signal and said fourth control signal to derive a fifth control signal whose frequency is equal to the sum of the frequencies of said first and fourth control signals, means for mixing said second control signal and said third control signal to obtain a sixth control signal whose frequency is equal to the sum of the frequencies of said second and third control signals, and means for subtracting the phase of one of said fifth and sixth control signals from the phase of the other to obtain said third position indicating signal, and said difference means comprises means for mixing said first and fourth control signals to derive a seventh control signal whose frequency is equal to the difference of the frequencies of said first and fourth control signals, means for mixing said second and third control signals to derive an eighth control signal whose frequency is equal to the difference of the frequencies of said second and third control signals, and means for subtracting the phase of one of said seventh and eighth control signals from the phase of the other to obtain said fourth position indicating signal.

9. The radio navigation system of claim 7 in which:

said first means comprises a first phase meter indicating the difference in the phases of said first and second control signals, said second means comprises a second phase meter indicating the difference in the phases of said fourth and third control signals, said summing means comprises means for mechanically adding the shaft angles of the indicators of said first and second phase meters, and said difference means comprises means for mechanically subtracting the shaft angles of the indicators of said first and second phase meters.

10. The radio navigation system of claim 7 in which:

said first means comprises a first phase meter indicating the difference in the phases of said first and second control signals, said second means comprises a second phase meter indicating the difference in the phases of said third and fourth control signals, said summing means comprises a first phase shifter, means for applying said second control signal to said first phase shifter, means for advancing said first phase shifter by the shaft angle of said second phase meter, and means for obtaining said third position indicating signal from the difference in the phases of said first control signal and the output signal of said first phase shifter, and said difference means comprises a second phase shifter, means for applying said fourth control signal to said second phase shifter, means for retarding said second phase shifter by the shaft angle of said first phase meter, and means for obtaining said fourth position indicating signal from the difference in the phases of said third control signal and the output signal of said second phase shifter.

11. A receiver for use in a radio navigation system which includes a base station for transmitting a continuous wave signal having a first predetermined frequency, a first relay station comprising a first relay station receiver for receiving signals broadcast by said base station, a first modulatable transmitter for generating a first carrier signal having a frequency differing from one-half of said first predetermined frequency by an amount equal to one-half of a second predetermined frequency, means for doubling the frequency of said first carrier signal, means for mixing said doubled first carrier signal with the output of said first relay station receiver to derive a first modulating signal whose frequency is equal to said second predetermined frequency, and means for applying said first modulating signal to said first modulatable transmitter, whereby said first relay station transmits said first carrier signal modulated by said first modulating signal, and a second relay station comprising a second relay station receiver for receiving signals broadcast by said base station, a second modulatable transmitter for generating a second carrier signal having a frequency differing from one-half of said first predetermined frequency by an amount equal to one-half of a third predetermined frequency, means for doubling the frequency of said second carrier signal, means for mixing said doubled second carrier signal with the output of said second relay station receiver to derive a second modulating signal whose frequency is equal to said third predetermined frequency, and means for applying said second modulating signal to said second modulatable transmitter whereby said second relay station transmits said second carrier signal modulated by said second modulating signal, said receiver comprising:

first means for deriving a first position indicating signal indicative of the difference in the distances between said receiver and said base station and said first relay station, second means for deriving a second position indicating signal indicative of the difference in the distances between said receiver and said base station and said second relay station, summing means for adding said first and second position indicating signals to obtain a third position indicating signal indicative of a first line of position on which said receiver is located, and difference means for subtracting one of said first and second position indicating signals from the other to obtain a fourth position indicating signal indicative of a second line of positions on which said receiver is located.

12. The receiver of claim 11 which includes a main receiver for receiving all of the signals transmitted by said base station and said relay stations, said main receiver comprising:

a base receiver for receiving signals transmitted by said base station, a first relay receiver for receiving signals transmitted by said first relay station and for recovering said first carrier signal and said first modulating signal, means for doubling the frequency of said recovered first carrier signal and for mixing said doubled first carrier signal with the output signal of said base receiver, whereby a first control signal having said second predetermined frequency is derived, said recovered first modulating signal comprising a second control signal having said second predetermined frequency, a second relay receiver for receiving signals transmitted by said second relay station and for recovering said second carrier signal and said second modulating signal, means for doubling the frequency of said recovered second carrier signal and for mixing said doubled second carrier signal with the output signal of said base receiver, whereby a third control signal having said third predetermined frequency is derived, said recovered second modulating signal comprising a fourth control signal having said third predetermined frequency, and in which said first means comprises means for subtracting the phase of one of said first and second control signals from the phase of the other to derive said first position indicating signal and said second means comprises means for subtracting the phase of one of said third and fourth control signals from the phase of the other to derive said second position indicating signal.

13. The receiver of claim 12 which:

said summing means comprises means for mixing said first control signal and said fourth control signal to derive a fifth control signal whose frequency is equal to the sum of the frequencies of said first and fourth control signals, means for mixing said second control signal and said third control signal to obtain a sixth control signal whose frequency is equal to the sum of the frequencies of said second and third control signals, and means for subtracting the phase of one of said fifth and sixth control signals from the phase of the other to obtain said third position indicating signal, and said difference means comprises means for mixing said first and fourth control signals to derive a seventh control signal whose frequency is equal to the difference of the frequencies of said first and fourth control signals, means for mixing said second and third control signals to derive an eighth control signal whose frequency is equal to the difference of the frequencies of said second and third control signals, and means for subtracting the phase of one of said seventh and eighth control signals from the phase of the other to obtain said fourth position indicating signal.

14. The receiver of claim 12 in which:

said first means comprises a first phase meter indicating the difference in the phases of said first and second control signals, said second means comprises a second phase meter indicating the difference in the phases of said fourth and third control signals, said summing means comprises means for mechanically adding the shaft angles of the indicators of said first and second phase meters, and said difference means comprises means for mechanically subtracting the shaft angles of the indicators of said first and second phase meters.

15. The receiver of claim 12 in which:

said first means comprises a first phase meter indicating the difference in the phases of said first and second control signals, said second means comprising a second phase meter indicating the difference in the phases of said third and fourth control signals, said summing means comprising a first phase shifter, means for applying said second control signal to said first phase shifter, means for advancing said first phase shifter by the shaft angle of said second phase meter, and means for obtaining said third position indicating signal from the difference in the phases of said first control signal and the output signal of said first phase shifter, and said difference means comprises a second phase shifter, means for applying said fourth control signal to said second phase shifter, means for retarding said second phase shifter by the shaft angle of said first phase meter and means for obtaining said fourth position indicating signal from the difference in the phases of said third control signal and the output signal of said second phase shifter.

16. A receiver for use in radio navigation system which includes a first base station for transmitting a continuous wave signal having a first predetermined frequency, a first relay station comprising a first relay station receiver for receiving signals broadcast by said first base station, a first modulatable transmitter for generating a first carrier signal having a frequency differing from one-half of said first predetermined frequency by an amount equal to one-half of a second predetermined frequency, means for doubling the frequency of said first carrier signal, means for mixing said doubled first carrier signal with the output of said first relay station receiver to derive a first modulating signal whose frequency is equal to said second predetermined frequency, and means for applying said first modulating signal to said first modulatable transmitter, whereby said first relay station transmits said first carrier signal modulated by said first modulating signal, a second base station for transmitting a continuous wave signal having a third predetermined frequency, and a second relay station comprising a second relay station receiver for receiving signals broadcast by said second base station, a second modulatable transmitter for generating a second carrier signal having a frequency differing from one-half of said third predetermined frequency by an amount equal to one-half of a fourth predetermined frequency, means for doubling the frequency of said second carrier signal, means for mixing said doubled carrier signal with the output of said second relay station receiver to derive a second modulating signal whose frequency is equal to said fourth predetermined frequency, and means for applying said second modulating signal to said second modulatable transmitter, whereby said second relay station transmits said second carrier signal modulated by said second modulating signal, said receiver comprising:

first means for deriving a first position indicating signal indicative of the difference in the distances between said receiver and said first base station and said first relay station, second means for deriving a second position indicating signal indicative of the difference in the distances between said receiver and said second base station and said second relay station, summing means for adding said first and second position indicating signals to obtain a third position indicating signal indicative of a first line of position on which said receiver is located, and difference means for subtracting one of said first and second position indicating signals from the other to obtain a fourth position indicating signal indicative of a second line of position on which said receiver is located.

17. The receiver of claim 16 which includes a main receiving means for receiving all of the signals transmitted by said first and second base station and said first and second relay stations, said means receiving means comprising:

a first base receiver for receiving signals transmitted by said first base station, a first relay receiver for receiving signals transmitted by said first relay station and for recovering said first carrier signal and said first modulating signal, means for doubling the frequency of said recovered first carrier signal and for mixing said doubled first carrier signal with the output signal of said first base receiver, whereby a first control signal having said second predetermined frequency is derived, said recovered first modulating signal comprising a second control signal having said second predetermined frequency, a second base receiver for receiving signals transmitted by said second base station, a second relay receiver for receiving signals transmitted by said second relay station and for receiving said second carrier signal and said second modulating signal, means for doubling the frequency of said recovered second carrier signal and for mixing said doubled second carrier signal with the output signal of said second base receiver, whereby a third control signal having said fourth predetermined frequency is derived, said recovered second modulating signal comprising a fourth control signal having said fourth predetermined frequency, and in which said first means comprises means for subtracting the phase of one of said first and second control signals from the phase of the other to derive said first position indicating signal and said second means comprises means for subtracting the phase of one of said third and fourth control signals from the phase of the other to derive said second position indicating signal.

18. The receiver of claim 17 in which:

said summing means comprises means for mixing said first control signal and said fourth control signal to derive a fifth control signal whose frequency is equal to the sum of the frequencies of said first and fourth control signals, means for mixing said second control signal and said third control signal to obtain a sixth control signal whose frequency is equal to the sum of the frequencies of said second and third control signals, and means for subtracting the phase of one of said fifth and sixth control signals from the phase of the other to obtain said third position indicating signal, and said difference means comprises means for mixing said first and fourth control signals to derive a seventh control signal whose frequency is equal to the difference of the frequencies of said first and fourth control signals, means for mixing said second and third control signals to derive an eighth control signal whose frequency is equal to the difference of the frequencies of said second and third control signals, and means for subtracting the phase of one of said seventh and eighth control signals from the phase of the other to obtain said fourth position indicating signal.

19. The receiver of claim 17 in which:
said first means comprises a first phase meter indicating the difference in the phase of said first and second control signals,
said second means comprises a second phase meter indicating the difference in the phases of said fourth and third control signals,
and summing means comprises means for mechanically adding the shaft angles of the indicators of said first and second phase meters,
and and difference means comprises means for mechanically subtracting the shaft angles of the indicators of said first and second phase meters.

20. The receiver of claim 17 in which:
said first means comprises a first phase meter indicating the difference in the phases of said first and second control signals,
said second means comprising a second phase meter indicating the difference in the phases of said third and fourth control signals,
and summing means comprising a first phase shifter, means for applying said second control signal to said first phase shifter, means for advancing said first phase shifter by the shaft angle of said second phase meter, and means for obtaining said third position indicating signal from the difference in the phases of said first control signal and the output signal of said first phase shifter, and
said difference means comprises a second phase shifter, means for applying said fourth control signal to said second phase shifter, means for retarding said second phase shifter by the shaft angle of said first phase meter, and means for obtaining said fourth position indicating signal from the difference in the phases of said third control signal and the output signal of said second phase shifter.

21. A radio navigation system for determining the position of a mobile station relative to a plurality of fixed stations, comprising:
a first pair of fixed transmitting stations comprising a first base station and a first relay station,
a second pair of fixed transmitting stations comprising a second base station and a second relay station,
a mobile station,
first means located at said mobile station for deriving a first position indicating signal indicative of the difference in the distances between said mobile station and each of said first pair of fixed transmitting stations,
second means located at said mobile station for deriving a second position indicating signal indicative of the difference in the distances between said mobile station and each of said second pair of fixed transmitting stations,
said mobile station including receiving means for receiving the signals transmitted by said transmitting stations and for deriving control signals from the signals so received to control said first means and said second means,
summing means for adding said first and second position indicating signal indicative of a first line of position on which said mobile station is located, and
difference means for subtracting one of said first and second position indicating signals from the other of said first and second position indicating signals to obtain a fourth position indicating signal indicative of a second line of position on which said mobile station is located,
the location of said base and relay stations forming a quadrilateral with said first base station and said first relay station being positioned at first diagonally opposed points of said quadrilateral and said second base station and said second relay station being positioned at second diagonally opposed points of said quadrilateral.

* * * * *